(12) United States Patent
Amit

(10) Patent No.: US 11,349,855 B1
(45) Date of Patent: May 31, 2022

(54) SYSTEM AND METHOD FOR DETECTING ENCRYPTED RANSOM-TYPE ATTACKS

(71) Applicant: TEN ROOT CYBER SECURITY LTD., Tel Aviv (IL)

(72) Inventor: Dor Amit, Tel Aviv (IL)

(73) Assignee: TEN ROOT CYBER SECURITY LTD., Tel Aviv (IL)

( * ) Notice: Subject to any disclaimer, the term of this patent is extended or adjusted under 35 U.S.C. 154(b) by 0 days.

(21) Appl. No.: 17/665,223

(22) Filed: Feb. 4, 2022

(51) Int. Cl.
*H04L 9/40* (2022.01)
*G06N 20/00* (2019.01)
*G06F 9/54* (2006.01)

(52) U.S. Cl.
CPC .......... *H04L 63/1416* (2013.01); *G06F 9/547* (2013.01); *G06N 20/00* (2019.01); *H04L 63/1425* (2013.01); *H04L 63/1491* (2013.01)

(58) Field of Classification Search
CPC ............. H04L 63/1416; H04L 63/1425; H04L 63/1491; G06F 9/547; G06N 20/00
USPC ......................................................... 726/23
See application file for complete search history.

(56) References Cited

U.S. PATENT DOCUMENTS

| | | | |
|---|---|---|---|
| 11,263,321 B2* | 3/2022 | Subbarayan | H04L 41/147 |
| 2012/0174224 A1* | 7/2012 | Thomas | G06F 21/566 726/24 |
| 2013/0263226 A1* | 10/2013 | Sudia | G06F 21/60 726/4 |
| 2015/0058981 A1* | 2/2015 | Stolfo | G06F 21/564 726/23 |
| 2015/0326587 A1* | 11/2015 | Vissamsetty | H04L 63/1416 726/23 |
| 2015/0326588 A1* | 11/2015 | Vissamsetty | H04L 63/1491 726/23 |
| 2018/0114020 A1* | 4/2018 | Hirschberg | G06F 21/566 |
| 2018/0324214 A1* | 11/2018 | Schoenherr | G06F 21/552 |
| 2020/0089876 A1* | 3/2020 | Aharoni | G06F 21/566 |

* cited by examiner

*Primary Examiner* — Badrinarayanan
*Assistant Examiner* — Badri-Champakesan
(74) *Attorney, Agent, or Firm* — Bookoff McAndrews, PLLC

(57) ABSTRACT

A computer-implemented system and method for detecting and terminating a ransomware attack at its very early stage, reducing damages of data loss if occurred, while minimally disturbing ongoing operations within the organization's most demanding business goals (RTO/RPO).

18 Claims, 10 Drawing Sheets

SYSTEM AND METHOD FOR DETECTING ENCRYPTED RANSOM-TYPE ATTACKS

FIELD

The disclosure relates in general to the field of cyber security. More specifically, the disclosure relates to a method and system for detecting a ransomware attack at its very early stage and reducing damages of data loss if occurred.

BACKGROUND

Private entities and organizations in various industry, commercial, and government sectors suffer from huge damages associated with ransomware attacks that have become more frequent these days. A ransomware attack is characterized by an attacker utilizing stolen privileges to gain access and introduce malware software to the victim's system and make it non-usable due to disablement of access to critical data, in most cases by encryption of the victim's most valuable files. Following the attack, demand for significant payment is typically displayed to the victim, together with a concealed address for submitting the payment. To maximize the damage to the victim, enforcing him to pay the ransom, typical ransomware also tries to destroy (or encrypt) all the backups available to the victim.

Recovering the valuable encrypted files within the organization's designated business goals (RTO\RPO) is almost impossible (in terms of efforts and time) by conventionally available tools. Therefore, once affected, the victim depends only on the "kindness" of the attacker.

Once the victim pays the ransom to the attacker's satisfaction, the attacker generally sends instructions (such as a decryption key), enabling the victim to recover and regain access to the encrypted files.

While there are types of ransom attacks that do not apply encryption, those types are generally beyond the focus of this description. Hereinafter, if not otherwise stated, the description assumes ransomware designed to prohibit access to selected files by utilizing encryption.

To some extent, the ransomware encryption operation is systematic. For example, (a) specific recognizable sequences of input/output (I/O) operations are applied, (b) only specific types of files are encrypted (others are ignored), (c) in some cases, only a portion of each file is encrypted, etc. However, attackers apply sophisticated techniques to conceal the existence and operation of the ransomware before and during its operation.

Various techniques have been developed to detect ransomware at its very early stage, eliminating its operation, and recovering the infected files to the extent possible. The techniques, in general, try to detect a "fingerprint" of ransomware in progress, and when this is detected, the ransomware process is terminated to minimize damages. However, while these detection techniques have been somewhat adequate, recently developed ransomware-type malware successfully override these detection techniques by better concealing the ransomware in progress, making its behavioral fingerprint and the infected files structure look similar to a legitimate process.

SUMMARY

It is an object of the disclosure to provide a protection system against ransomware data loss risk overcoming deficiencies of prior art techniques.

It is another object of the disclosure to provide within said system capabilities to detect and terminate ransomware at its very early stage of operation.

It is still another object of the disclosure to provide a solution to ransomware data loss risk while minimally disturbing ongoing operations within the organization's most demanding business goals (RTO/RPO).

It is still another object of the disclosure to provide a solution to ransomware data loss risk while minimally disturbing ongoing operations within the organization's most demanding business goals (RTO/RPO).

In some examples, a computer-implemented method for detecting and terminating a ransomware attack is disclosed. The method can include protecting, by a Volume Shadow Copy Service (VSS) protection module, against deletion and handling application programming interface (API) calls; handling input output (I/O) operations, by a Honeypot protection module, so that honeypot hard links (HL) are utilized as a second pointer that a same valid file data is pointed to without consuming extra disk space; considering as invalid any I/O operations of Delete or Write to the honeypot HL without performing an exclusion procedure; conveying I/O operations considered invalid as High-Fidelity Alert operations that should be terminated; handling, by a single I/O operation module, Read, Write, Delete, Rename and Create I/O operations; handling I/O operations, by a Realtime module and a near Realtime module, at least some of the I/O operations including an Audit log and Context & Content Analyzer configured to convey to a rules based engine; using characteristic parameters of one or more known classified ransomware during a training phase to create a machine-learning-based model configured to analyze data in the audit log issuing a risk score and context reflecting a probability that an audit log timeline per process at its input reflects ransomware; serving, by the audit log, the Realtime module and the near Realtime module as a data source for a machine learning (ML) analytic module of a ransomware behavioral fingerprint; marking for further inspection, during normal system operation, content of the audit log that contains operations, properties and context; analyzing for possible anomalies, by the audit log, the content marked for further inspection to indicate one or more behavioral parameters of a running process; defining, by the rules based engine, a conclusion and actions based on a risk score and context received from the Realtime module and the near Realtime module, the conclusion and the actions including one or more actions to be taken, a decision to audit and monitor further in case that the risk score and context does not show significant probability of ransomware; upon operation of the High Fidelity Alert operations, terminating a respective process and performing at least one of (a) an alert to an administrator; (b) checking for possible damages; (c) recovery of damaged files utilizing a main backup if still available, HL backup or the VSS; (d) investigation of the detected ransomware to further train a machine-learning near-Realtime module; and performing one or more exclusion procedures on API calls and I/O operations configured to determine whether a related operation is performed by an authorized human being and/or an authorized non interactive process, the one or more exclusion procedures including one or more manipulations of interactive operation, process name, process type, timeframe, geo-location, source-target IP-server of an operation user identity, user roles, target file properties, operating system (OS) type and state, using MFA (multi-factor authentication), signed operation and one or more user defined measurable property for limiting or prohibiting the performance of actions.

In some examples, an alert from the High Fidelity Alert operations is an indication for ransomware.

In some examples, the method can include hooking and verifying, by at least part of a hook process, any Delete API call relating to VSS by a verification entity, the hook process being configured to monitor and detect an attempt to delete the VSS.

In some examples, the method can include creating the HL for every file of Delete I/O operations without performing the one or more exclusion procedures; and composing, by a HL file naming convention, of a fixed length unique hash of a file full path and a timestamp.

In some examples, the audit log is associated with a respective context, and wherein records within the audit log include one or more of context parameters including Process Image, Process Name, Process ID, Parent Process ID, Timestamp, Source File Path, Target File path only for Delete I/O operations, Target File name, the respective operation, UHash, FHash, Entropy, User (security context), File signature, Domain, logon type (interactive\non-interactive).

In some examples, the audit log is associated with a respective context for the Rename I/O operations, wherein records within the audit log include one or more of context parameters including a timestamp, an old file name, a new file name, an auditing and a change of extension only.

In some examples, the method can include composing a HL file naming of a fixed length unique hash of a file full path and the timestamp to ensure that an HL copy with a unique name is generatable.

In some examples, the method can include upon receiving a Delete API call relating to VSS, conveying the Delete API call to a VSS handler to verify performing of the exclusion procedure; if the exclusion procedure is performed, approving and performing the Delete API call and performed; and if the exclusion procedure is not performed, proceeding to High Fidelity Alert operations that are terminated.

In some examples, the method can include upon receiving, hooking and verifying an I/O operation, whether the I/O operation tries to delete or write to a honeypot HL, if verified as an attempt to delete or write to a honeypot HL, transferring the I/O operation to verify if the exclusion procedure was performed; if the exclusion procedure was performed, continuing performance of the I/O operation; and if the exclusion procedure was not performed, terminating the I/O operation.

In some examples, the method can include applying, by the exclusion procedure, one or more additional limitations using a user's ID, one or more predetermined hours during a day, a source workstation from which an operation request was initiated, and a location of a requesting workstation.

In some examples, the method can include receiving the Delete I/O operation; hooking and verifying the Delete I/O operation of the exclusion procedure; and if the exclusion procedure has been performed, then approving, completing and auditing the Delete I/O operation.

In some examples, the method can include upon receiving the Delete I/O operation, hooking and verifying if the Delete I/O operation attempts to delete a backup HL; and if a response is no to deleting the backup HL, approving, completing, and auditing the Delete I/O operation; if the response is yes to deleting the backup HL, transferring the Delete I/O operation in order to verify if the exclusion procedure was performed; if the exclusion procedure was performed, continuing the I/O operation to be completed and audited; if the exclusion procedure was not performed, terminating the I/O operation.

In some examples, the method can include upon receiving the Delete I/O operation, performing with a cooperation of the near Realtime module, the cooperation including a Write operation to write to a file offset location, hooking the Write I/O operation and verify performing of the exclusion procedure; if the exclusion procedure is performed, approving and completing the I/O operation including write/delete operations; and If the exclusion procedure was not performed, terminating and auditing the I/O operation.

In some examples, the method can include receiving and hooking a Create/Rename File I/O operation, unless any other specific indication of ransomware appear, and the operation is audited and allowed to complete.

In some examples, the method can include upon receiving and hooking the Write I/O operation, capturing a requested change from operation file offset address; conveying the operation to check a user defined option for reference source data either to extract a respective section from a VSS latest copy or extract a respective section from original source file in Realtime; checking a completion of performing the exclusion procedure; if the exclusion procedure is performed, completing the operation; and if the exclusion procedure is not performed, completing the operation is allowed only after one or more changes in the audit log, the one or more changes including changes in one or more context parameters and a change in file data.

In some examples, for every Write I/O operation, one or more records within the audit log include one or more of context parameters including Changed Offset address(es), File signature, Process Image, Process Name, Process ID, Parent Process ID, Timestamp, File Path, UHash, FHash, Logon type, Entropy, User, Domain.

In some examples, the method can include receiving, by the rules based engine, incidents with an assigned risk score from the ML analytic module and comparing it to a user predefined threshold; and performing one or more of the following actions: —Preventing process access to files (using a hook technic); —Killing a process thread; —notifying a moderator by Email\SMS; —applying Hardening policy based on compliance baseline; —Restoring a file from HL; —Presenting interactive interface for file restoration for end-user; —dumping an entire memory or specific process to disk; —initiating forensic procedure, including full artifacts collections; —Add found IOC's to endpoint detection and response (EDR); —Applying advanced auditing on files, folders and file shares; —Blocks\Monitors network protocols that can be used for C2\Lateral movement\Data exfiltration; —Sending collected data to a syslog\siem; —Forcing MFA for authentication; —Initiating proactive threat hunting process; —Restoring file\folder from VSS backup; or—Checking a process image with 3rd party malware analysis service API.

In some examples, the ransomware behavioral fingerprint includes (a) suspected I/O sequences indicative of ransomware; (b) suspected content modifications to one or more files causing some specific file types to exceed normative threshold for fuzzy, hash or entropy tests; (c) an operation configured to delete Decryption keys; (d) a repetitive execution of encryption related I/O operations within a predefined period.

In some examples, a non-transitory computer-readable medium is disclosed storing instructions that, when executed by a processor, cause the processor to perform any method of this disclosure.

In some examples, the ransomware behavioral fingerprint includes (a) suspected I/O sequences indicative of ransomware; (b) suspected content modifications to one or more files causing some specific file types to exceed normative threshold for fuzzy, hash or entropy tests; (c) an operation configured to delete Decryption keys; (d) a repetitive execution of encryption related I/O operations within a predefined period.

It is still another object of the disclosure to provide a solution to ransomware data loss risk while minimally disturbing ongoing operations within the organization's most demanding business goals (RTO/RPO).

In some examples, a computer-implemented system and method is disclosed for detecting and terminating a ransomware attack at its very early stage, reducing damages of data loss if occurred, while minimally disturbing ongoing operations within the organization's most demanding business goals (RTO/RPO). The system can include a VSS protection module protecting against its deletion, handling API calls performing in Realtime before any damage was caused. Any Delete API call relating to VSS is hooked and verified by verification entity as part of hook process, being configured to monitor and detect an attempt to delete the VSS. A Honeypot protection module, handling I/O operations utilizing additionally to typical honeypot techniques created files and pointers (filenames) for serving as a honeypot, honeypot hard links (HL), being a second pointer that the system creates pointing to the same valid file data without consuming extra disk space. Any I/O operations of Delete or Write to a honeypot HL without performing an exclusion procedure is considered by the system as invalid and handled as High-Fidelity Alert (Alert) conveying the operation to termination. A single I/O operation module can be included for handling Read, Write, Delete/Erase, Rename and Create I/O operations. A ML analytic module of behavioral fingerprint can be included. A Realtime/near-Realtime module can be included for handling I/O operations, including: an Audit log and Context and Content Analyzer, conveying to Rule based engine (rules). The characteristic parameters of each known (classified) ransomware are used during a training phase to create the machine-learning-based model built to analyze the data in the audit log issuing a risk score and context reflecting the probability that the audit log timeline (per process) at its input reflects ransomware. The Audit log serves both the Realtime modules, (every Single I/O operation and context is logged in Realtime), and the near Realtime modules as data source for the analytic module. During normal operation of the system, the audit log contains various I/O operations, properties and context marked for further inspection and their content and context, (the behavioral parameters of the running process, as determined), are repeatedly analyzed by the audit log for possible anomalies. A Rules based engine, defines a conclusion and actions based on a risk score and context received from the Realtime and near Realtime module, including one or more actions to be taken, a decision to audit and monitor further in case that the risk score and context does not show significant probability of ransomware, and the use of unique optional actions. The High Fidelity Alert is a strong indication for ransomware, and following this alert, the system immediately terminates the respective process and follows additional steps selected from (a) an alert to the administrator; (b) checking for possible damages that have already occurred; (c) recovery of damaged files utilizing the main backup (if still available), HL backup or the VSS; (d) investigation of the detected ransomware to improve the capabilities of the machine-learning near-Realtime module, etc., (hereinafter "additional steps"). Exclusion procedures, being performed on API calls and I/O operations designed to ensure that the related operation is performed by an authorized human being or an authorized non interactive process, and usually include one or more manipulations of: interactive operation, process name, process type, timeframe, geo-location, source-target IP-server of the operation user identity, user roles, target file properties, OS type and state, using MFA (multi-factor authentication), signed operation etc. and any other custom\user defined measurable property, for limiting or prohibiting the performance of actions.

In some examples, HL is created for every file of Delete I/O operations without exclusion procedure and HL file naming convention composing of fixed length unique hash of the file full path and the timestamp.

In some examples, the Audit log is associated with a respective context, e.g., for Delete/Create I/O operations, the records within the log may include one or more of context parameters including Process Image, Process Name, Process ID, Parent Process ID, Timestamp, Source File Path, Target File path (Only for Delete operation), Target File name, the respective operation, UHash, FHash, Entropy, User (security context), File signature, Domain, logon type (interactive\non-interactive).

In some examples, the Audit log is associated with a respective context, e.g., for Rename I/O operations, the records within the log may include one or more of context parameters including Timestamp, Old file name, New file name, auditing as well is the change of extension only.

In some examples, a Delete API call relating to VSS is received, the API call is conveyed to VSS handler to verify performing of the exclusion procedure, if performed, the Delete API call is approved and performed, if exclusion procedure was not performed, it goes to Alert, terminated and the additional steps are taken.

In some examples, the honeypot protection module monitors the user's system to detect any attempt to delete a honeypot HL. When an I/O operation is received it is hooked and verified whether it tries to delete or write to a honeypot HL, if verified as an attempt to delete or write to a honeypot HL, the I/O operation is transferred to verify if exclusion procedure was performed; if performed the I/O operation continues to be performed, if exclusion procedure was not performed, the I/O operation is terminated and the additional steps are taken.

In some examples, the HL file naming is composed of fixed length unique hash of the file full path and the timestamp, ensures that there is always a possibility to generate HL copy with the unique name.

In some examples, the exclusion procedure may apply, besides user's intervention, additional limitations, e.g., using user's ID, specific hours during the day, source workstation, (from which the operation request was initiated), location of the requesting workstation, and any other parameter custom suitable to a specific user.

In some examples, a Delete I/O operation is received, the Delete I/O operation is hooked and verified of performing the exclusion procedure, if performed, the Delete I/O operation is approved, completed, and audited.

In some examples, a Delete I/O operation is received, hooked, and verified if the Delete I/O operation attempts to delete backup HL; if the response is N, the Delete I/O operation is approved, completed, and audited; if the response is Y, the Delete I/O operation is transferred to verify if exclusion procedure were performed; if performed the I/O operation continues to be completed and audited, if exclusion procedure were not performed, the I/O operation is terminated and the additional steps are taken.

In some examples, an I/O Erase operation is received, performed with the cooperation of the near Realtime module, includes a Write operation to write immediately to the same (file) offset location being previously deleted, the I/O Write operation is hooked, and verified performing of the exclusion procedure, if performed, the Write/(Erase)/I/O operation is approved, and completed, If the exclusion procedure was not performed, the Write I/O operation is terminated, audited and the additional steps are taken.

In some examples, an Create/Rename File I/O operation is received and hooked, unless any other specific indication of ransomware appear, the operation is audited and allowed to complete.

In some examples, a Write I/O operation is received and hooked, and capture requested change from operation (file offset address), the operation is conveyed to Check user defined option for reference source data, using two alternative options, either to extract the respective section from VSS latest copy, or extract the respective section from original source file in Realtime, in either option the completion of the performing of the exclusion procedure is checked, if performed, the operation is completed, if not performed the completion of the operation is allowed after auditing changes and context from original and changed file.

In some examples, for every Change (Write) I/O operation, the records within the log may include one or more of context parameters including Changed Offset address(s), File signature, Process Image, Process Name, Process ID, Parent Process ID, Timestamp, File Path, UHash, FHash, Logon type, Entropy, User, Domain.

In some examples, the rule-based engine gets incidents with assigned risk score from the analytic engine and compares it to a user predefined threshold, and wherein one or more of the following actions may be taken: —Preventing process access to files (using the hook technic); —Killing a process thread; —notifying a moderator by Email\SMS; —applying Hardening policy based on compliance baseline; —Restoring a file from HL; —Presenting interactive interface for file restoration for end-user; —dumping the entire memory or specific process to disk; —initiating forensic procedure, including full artifacts collections; —Add found IOC's to Edr; —Applying advanced auditing on files, folders and file shares; —Blocks\Monitors network protocols that can be used for C2\Lateral movement\Data exfiltration; —Sending collected data to a syslog\siem; —Forcing MFA for authentication; —Initiating proactive threat hunting process; —Restoring file\folder from VSS backup; —Checking the process image with 3rd party malware analysis service API.

In some examples, the ransomware behavioral fingerprint may include, e.g., (a) suspected I/O sequences typical to ransomware; (b) suspected content modifications to one or more files causing some specific file types to exceed normative threshold for fuzzy, hash or entropy tests; (c) operation intended to delete Decryption keys; (d) repetitive execution of encryption related I/O sequences within a predefined period.

Other objects and advantages of the disclosure become apparent as the description proceeds.

DETAILED DESCRIPTION OF PREFERRED EMBODIMENTS

As noted, a typical ransomware attack is characterized by the several features. For example:
1. The ransomware's operation is systematic;
2. In many cases, the ransomware targets files having specific extensions and/or targets files located in specific locations on the disk etc.;
3. The ransomware typically applies on the organization's files recognizable patterns of I/O operations (sequences) composed of I/O operations such as Read, Write, delete, (deletion of the file, however, leaving the file data intact), Erase (namely, replacing the files data by another random data right after Delete operation is performed—a data destroying operation), Create, namely, creating a new file, and Rename, namely, renaming of a file;
4. In some cases, the ransomware attempts to destroy all possible backups (including on-cloud backups);
5. The ransomware conceals its operation by imitating a legitimate operation. For example, the imitation may involve the reduction of the rate of its sequential I/O operations or varying the order of the utilized I/O operations. In another aspect, encryption changes may be made only to sections of each file data, thereby not exceeding a modification threshold that may fail an entropy check applied by the defender to detect a fingerprint of ransomware in progress, and using credentials stolen from legit user.

These are just a few of the technics taken by ransomware. Plenty more are discovered every day.

As elaborated hereinafter, the disclosure provides a comprehensive solution that overcomes all known techniques used by modern ransomware. More specifically, the system of the disclosure:
(a) detects and terminates ransomware at its very early stage with better accuracy than other solutions;
(b) creates and protects Microsoft's Volume Shadow Copy Service (VSS backup);
(c) utilizes the protected VSS backup for a variety of monitoring checks;

(d) utilizes several protection techniques to detect and eliminate ransomware, even those that successfully overcome all prior art ransomware protection systems by imitating legitimate processes.

Figure 1:
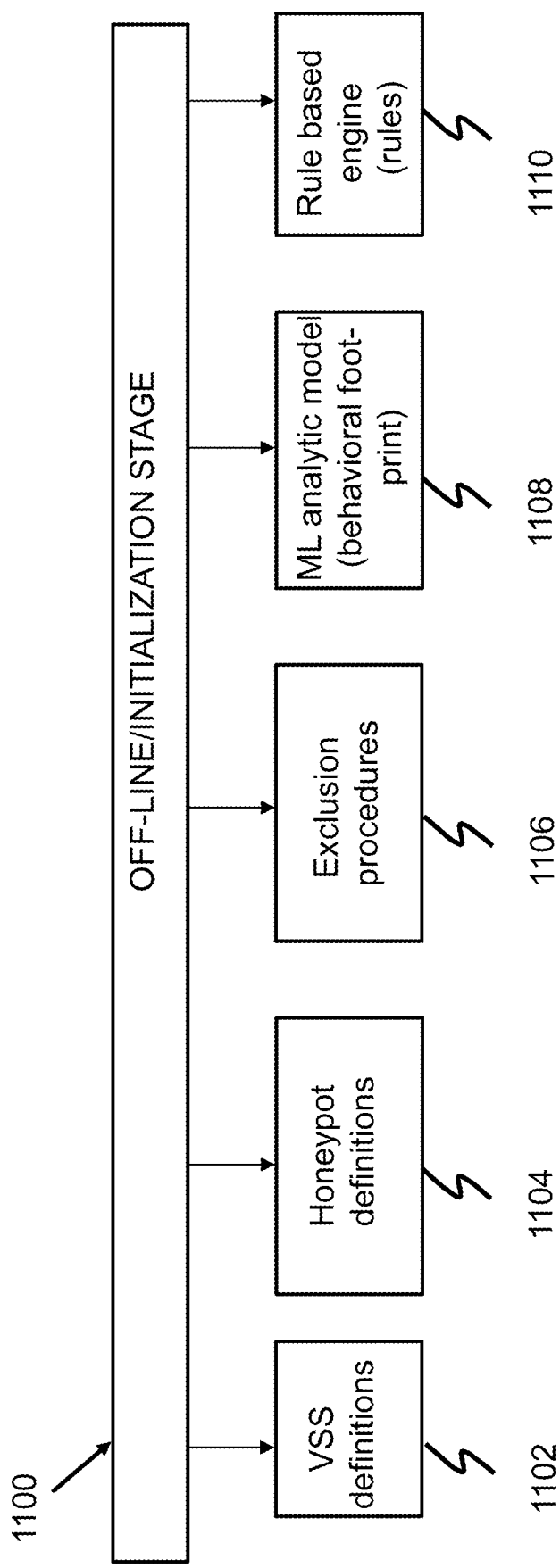
FIG. 1 is a block diagram of an off-line/initialization showing an overview of the components of the system and method.
Figure 3:
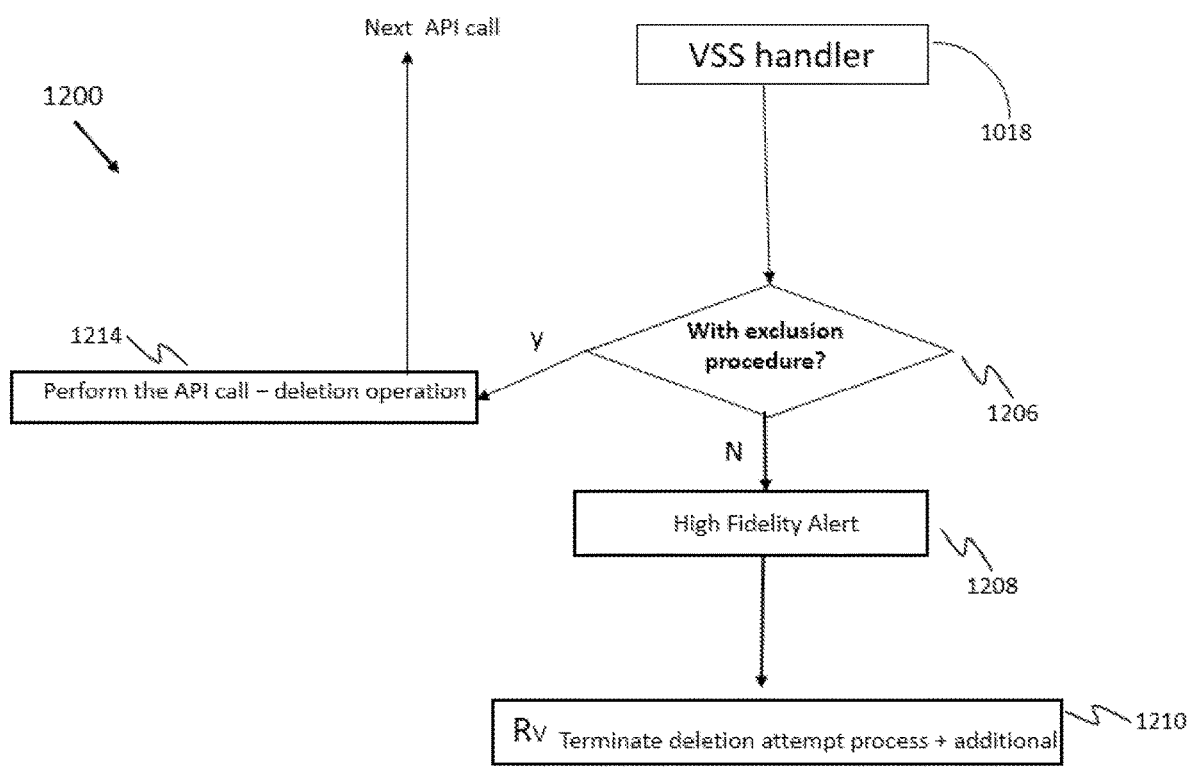
FIG. 3 is a block diagram of VSS module procedure treating attempt to delete VSS.

FIG. 1 illustrates an off-line initialization stage 1100 of the system of the disclosure. The initialization stage includes various preparations and definitions performed before the actual launch and operation of system 1000, as follows:

Volume Shadow Copy Service (VSS) definitions 1102 is a type of backup provided within Microsoft's environment. VSS is a user-defined Microsoft Windows service that captures snapshots called shadow copies. A snapshot is a read-only point-in-time copy of the volume. Snapshots allow the creation of consistent backups of an entire volume, ensuring that the content does not change or is locked while the backup is formed. The user can define the period between backups, the disk volume allocated for VSS backups, and more. While generally, user cannot rely on the VSS as the major or only backup, the VSS still provides some route for recovery from a malware attack. Therefore, the VSS forms a major attack target of each ransomware, trying to destroy it. As shown in FIG. 3, the disclosure provides a procedure to protect the VSS and utilizes the VSS content for additional purposes, as elaborated below.

For the disclosure, the VSS definitions 1102 include, for example, the disk volume, the amount of disk allocation, the duration between backups, etc.

In Honeypot definitions 1104, at least one honeypot Hard link (hereinafter also referred to as "honeypot hard links", or briefly "HL") is defined in each directory containing files of interest. Each honeypot HL directs to a valid file expected to be manipulated by ransomware, if and when it appears in the system. However, the honeypot HL receives a different name than the original filename (it is, in fact, an additional pointer to the valid file). Usually, the name and characteristics of the honeypot HL are selected with the intent to increase the probability that ransomware, if and when it appears, accesses the honeypot HL, at an early stage of its malicious operation.

The exclusion procedure 1106 includes One or more exclusion procedures, in order to limit or prohibit the performance of specific actions unless the respective exclusion procedure is successfully performed.

Usually, the exclusion procedures used by the disclosure are interactive to ensure that the related operation is performed by an authorized human being or by an authorized non interactive process, and not by an automatic initiated process. For example, an erase operation, as well as deletion and/or erase of the VSS are not expected to be performed by an automatic process (i.e., a process that is initiated automatically). In any case, the disclosure limits these activities to human intervention by providing an interactive procedure. For example, before permitting the related operation (or otherwise counting on overcoming the exclusion procedure challenge), the exclusion procedure is initiated, requiring the user's intervention. Besides user's intervention, additional limitations may be applied, for example, user's ID, specific hours during the day, source workstation, (from which the operation request was initiated), location of the requesting workstation, etc. In addition, various other parameters may be used.

There are many different user-defined settings and criteria for the exclusion procedure. These settings and criteria may include one or more manipulations of: interactive operation, process name, process type, timeframe, geo-location, source-target IP-server of the operation user identity, user roles, target file properties, OS type and state (like compliance), using MFA (multi-factor authentication), signed operation etc. and any other custom \user defined measurable property.

For example, the following properties may be used while defining the exclusion procedure:

Username—a user account who initiates the operation;
Process Name—a user account that initiates the operation;
Process Image Signature—a process image certificate (digital signature);
Timeframe—a timeframe in which the operation was initiated (aka:12/12/2021 20:00-13/12/2021 21:00)
Parent Process Name
Interactive\Non-interactive—was the action performed by an interactive user or automatic process;
Process Image Path—the image file path which the process created from;
Process image Hash—A unique identifier of the process image file;
OS Compliance state—whether the Endpoint has endpoint detection response (EDR)\antivirus (AV), supported OS etc.
User Account properties—Group memberships, Local\Domain account etc.
Moderator Approval—using BPM (Business process management) with Moderator interactive approval (such as Push notification to mobile phone).

Example: Only process named backup.exe, with signed binary, initiated between 20:00-21:00 by the user 10root\dor interactively can perform erase, delete file honeypot etc.

Figure 2:
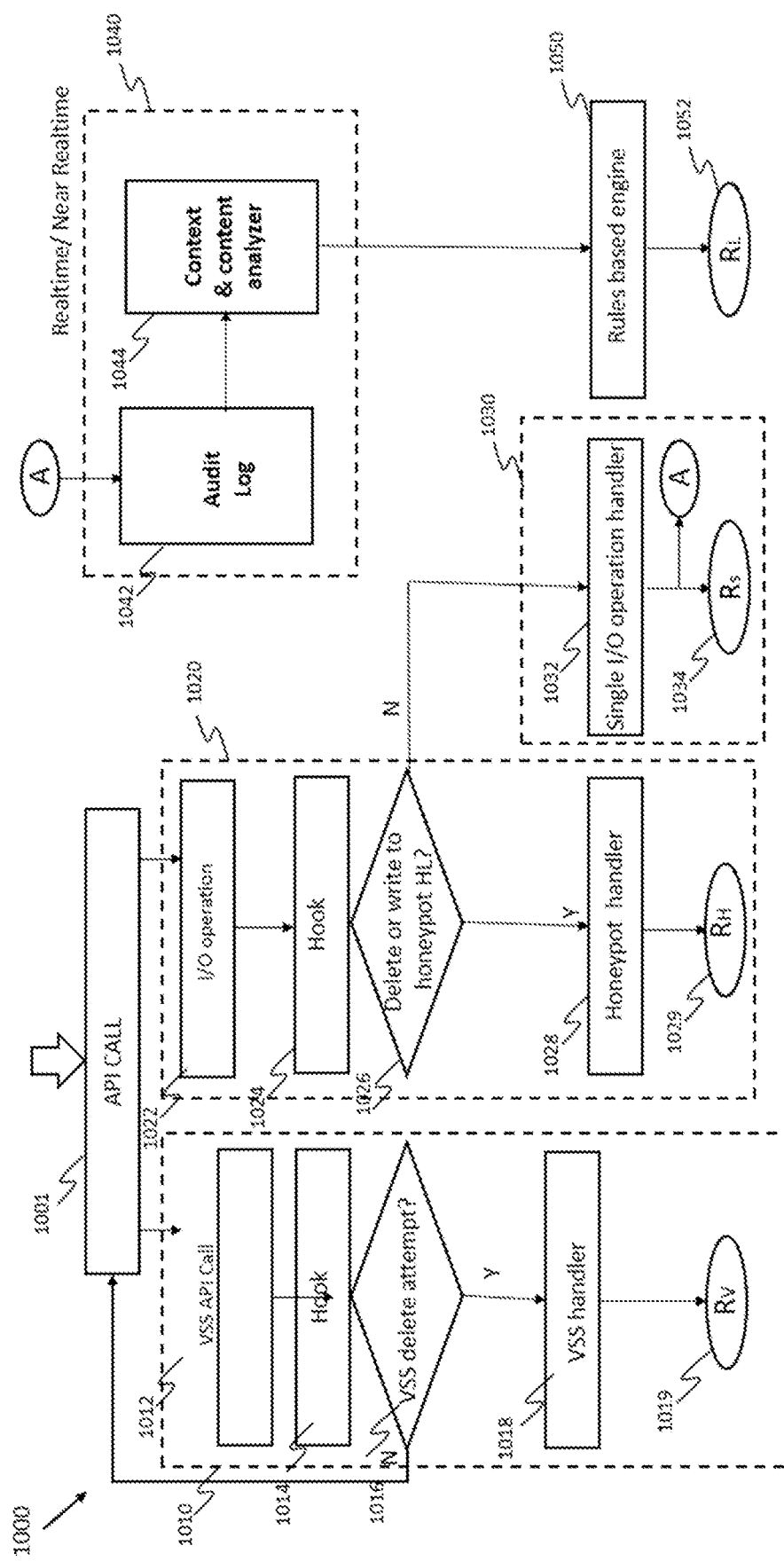
FIG. 2 is a block diagram generally illustrating a ransomware protection system according to an embodiment of the disclosure.

Machine learning (ML) analytic model (behavioral fingerprint) 1108 includes a context and content analyzer being a machine learning unit 1044 (FIG. 2). This unit within the near real-time module 1040 is created during a training phase before the system's actual operation and it constantly updates its database with new tactics, characteristics, and manipulations of ransomware from public sources as well as from confirmed ransomware alerts discovered by the system.

Rules 1110 are the Rules based engine of unit 1050 (FIG. 2). These rules define a conclusion and actions based on a risk score & context received from the Realtime and near Realtime module 1040 (FIG. 2), comprising one or more actions to be taken, a decision to audit and monitor further in case that the risk score & context does not show significant probability of ransomware, and the use of unique optional actions like, initiating an Alert by Email\SMS\Other, suspending the suspected process until interactive moderator approval, restoring file\folder from VSS backup, checking the process image with 3rd party malware analysis service application programming interface (API) (aka: VirusTotal, any.run etc.), adding found IOC's to EDR, initiating proactive threat hunting process, Block\Monitor network protocols that can be used for C21Lateral movement\Data exfiltration, sending collected data to a syslog\siem, restoring a file from HardLink (HL), dumping the entire memory or specific process to disk, killing a process thread, preventing process access to files (using the same hook technic), presenting interactive interface for file restoration for end-user, applying hardening/compliance policy on attacked system, applying advanced auditing on files, folders and file shares, initiating forensic procedure including full artifacts collections;

Example:
Incident with Risk score of 90 (out of 100) & specific ransomware related context triggers the following actions: kills the thread which initiate the file deletion, prevents it from deleting additional files, raises an alert to predefined moderator (aka: The organization's CISO), restores the original file from the created HL, applies hardening policy GPO based, (defined in compliance baseline).

FIG. 2 generally illustrates a ransomware protection system according to an embodiment of the disclosure in a block diagram. In general, the system includes four protection modules that operate contemporaneously: a VSS protection module 1010, a honeypot protection module 1020, a single I/O operation module 1030, and a Realtime/a near-Realtime module 1040.

The VSS protection module 1010 protects the VSS against its deletion, as the VSS serves two main system functions: (a) it forms a basis for emergency backup when it becomes necessary; and (b) in some embodiments, it provides a basis for analysis of file content modification as further described in FIG. 10.

Various types of API calls are received at API call entity 1001. Each API call 1012 relating to the VSS is hooked 1014 for further verification. Verification entity 1016 as part of the hook procedure 1014 is configured to monitor and detect an attempt to delete the VSS by any API call.

If an attempt to delete the VSS is detected and verified by entity 1016, this attempt is conveyed to VSS handler 1018, which in turn handles the deletion attempt, forming a result Rv 1019 (see further FIG. 3). If, however, entity 1016 determines that the VSS API call does not attempt to delete the VSS, hook operation 1014 releases the API call, and it is forwarded by entity 1001 to perform the API call.

The three other modules within system 1000 of the disclosure (shown in FIG. 2) handle I/O operations, as follows:
- (a) the honeypot module 1020 and the single I/O operation module 1030, each handling a single operation at each given time (where the honeypot module is a private use case relating to a specific I/O operation trying to tamper with a honeypot HL directing to a file). The single I/O operation module 1030 handles all other I/O operations that are not dealt by the honeypot module, and
- (b) A near Realtime module 1040 that inspects at any given period a plurality of I/O operations (I/O sequences) that are designated for audit.

I/O operation entity 1022, the hook entity 1024, and the decision entity 1026 are common to the honeypot module 1020 and to the single I/O operation module 1030. They are shown in FIG. 2 as being included within the honeypot module for the sake of convenience only.

As further elaborated hereinafter, honeypot pointers HL are spread within the user's system. In contrast to typical honeypot techniques that utilize additionally created files (and pointers, namely, filenames) for serving as a honeypot, the disclosure utilizes honeypot HL for that purpose. Each honeypot HL is a second pointer that the system creates (in addition to the valid file pointer) that points to the same valid file data. However, while normally a user is expected to access the valid file data by utilizing the valid pointer (filename), ransomware may wrongly see the honeypot HL as the valid "filename" directing to the valid file data by not being aware that a honeypot technique is applied.

Any try to delete, erase, or write to a honeypot HL without performing an exclusion procedure 1106 is considered by system 1000 as invalid and handled accordingly. Therefore, the disclosure's technique is advantageous, as the honeypot HL does not consume any extra disk space, as it directs to an existing valid file data, and the creation of an additional file data for that purpose, is avoided.

More specifically, the honeypot protection module 1020 monitors the user's system to detect any attempt to delete a honeypot HL. In step 1022, an I/O operation is received from the API call entity 1001. The I/O operation is hooked by hook entity 1024. Entity 1026 verifies whether the hooked I/O operation tries to delete or write to a honeypot HL (an operation that is not expected to occur normally and validly). If entity 1026 determines an attempt to delete or write to a honeypot HL, the control is transferred to the honeypot handler 1028. The honeypot handler issues a result $R_H$ which is elaborated hereinafter. If, however, entity 1026 finds that the I/O operation does not try to delete or write to a honeypot HL, the hook of entity 1024 is released, and a new I/O operation can be conveyed from the API call entity 1001 into I/O operation entity 1022 and handled.

Further, any I/O operation hooked (by hook entity 1024) and determined (by entity 1026) as unrelated to a try of deletion or writing to a honeypot HL the I/O operation is conveyed to the single I/O operation module 1030.

The HL file naming convention which composed of Fixed length unique hash of the file full path and the timestamp ensures that even in very rare use-cases where there are several files with the same name, or the same file has been recreated and delete—there is always a possibility to generate HL copy with unique name in the same backup location (single folder).

The Realtime and near Realtime module 1040 include an audit log 1042 performing on Realtime and the near Realtime, and a context and content analyzer 1044, performing on near Realtime.

The context and content analyzer 1044 is a machine learning unit created based on a vast number of known and classified ransomware. Each known ransomware is analyzed to determine behavioral parameters that characterize this ransomware (such as sequences used, repetition of operations, partial, full, or header file encryption, number of specific operations performed during a predefined period, etc. The context & content analyzer 1044 is constantly updating the ML model after each detection of ransomware.

Assuming that all ransomwares have a common denominator, the characteristic parameters of each known (classified) ransomware are used during a training phase to create the machine-learning-based context and content analyzer 1044. The content and context analyzer 1044 is built to issue a risk score & context reflecting the probability that the audit log timeline at its input reflects ransomware.

The Audit log serves both the Realtime modules (every Single I/O operation & context is logged in Realtime) and the near Realtime modules as data source for the analytic module.

It should be noted that each record within the audit log is associated with a respective context. For example, for Delete I/O operations, the records within the log may include one or more of the following context parameters:
- (a) Process Image—the file which instantiated the process (namely, aka.EXE file);
- (b) Process Name—the process which initiated the operation;
- (c) Process ID—the PID of the process initiating the operation
- (d) Parent Process ID—the PID of the parent process initiating the operation;
- (e) Timestamp—the timestamp in which the operation started\initiated;
- (f) Source File Path—the Source Full file path including the file name and the file extension;

(g) Target File path—the respective HL Target Full file path (The HL file created backup after delete operation);
(h) Target File name—a globally unique name for the new HL file which is composed of a Fixed hash function (aka Sha512) of the original file full path+the Timestamp;
(i) The respective operation: delete\Erase\Change\Read\Create;
(j) UHash—unique Hash identifier of the file (aka: Sha1, Sha256, Sha512 etc.);
(k) FHash—Fuzzy Hash (aka, SSDEEP, TLSH);
(l) Entropy—calculate entropy (for text-oriented files). The entropy may be calculated utilizing various algorithms of statistical distribution such as Chi-square (Chi^2);
(m) User—The user (security context) under which the process invoking the operation is running;
(n) Domain—The Workgroup\Domain of the security context;
(o) File signature—the file type as defined in the first 512 bytes;
(p) Logon type—Describe if the operation performed under interactive or non-interactive context For every Change (Write) I/O operation the records within the log may include one or more of the following context parameters:
(a) Change Offset address(es)—The data changed within the file (aka: an offset into a file is simply the character location within that file, usually starting with 0);
(b) File signature—the file type as defined in the first 512 bytes;
(c) Process Image—the file which instantiated the process (aka: EXE file);
(d) Process Name—the process which initiated the Change operation;
(e) Process ID—the PID of the process initiating the Change operation;
(f) Parent Process ID—the PID of the parent process initiating the Change operation;
(g) Timestamp—the timestamp in which the Change operation started\initiated—the PID of the parent process initiating the operation;
(h) File Path—the Full file path including the file name and the file extension;
(i) UHash—unique Hash identifier of the file (aka: Sha1, Sha256, Sha512 etc.);
(j) FHash—Fuzzy Hash for the changed data in the file (aka: SSDEEP, TLSH;
(k) Entropy—calculate Entropy for changed data in the file (for text-oriented source files). Can be calculated with various algorithms of statistical distribution such as Chi-square (Chi^2);
(l) User—The user (security context) under which the process which invokes the operation is running;
(m) Domain—The Workgroup\Domain of the security context.
(n) Logon type—Describe if the operation performed under interactive or non-interactive context For every Rename I/O operation the records within the log may include one or more of the following context parameters:
(a) Timestamp—the timestamp in which the operation started\initiated;
(b) Original filename—The original filename & extension before it was changed;
(c) New file name—Full file name include the extension (audited as well is the change of extension only).

During the normal operation of system 1000, audit log 1042 receives from other modules of the system various I/O operations marked for further inspection and their context (namely, the behavioral parameters of the running process, as determined). The context and content analyzer 1044 repeatedly analyzes the audit log for possible anomalies.

Ransomware behavioral fingerprint may include, for example, (a) suspected I/O sequences (namely, containing more than one I/O operation) typical to ransomware; (b) suspected content modifications to one or more files is a private use case of I/O sequence (for example, causing some specific file types to exceed normative threshold for fuzzy hash or entropy tests; (c) operation intended to delete Decryption keys; (d) repetitive execution of encryption related I/O sequences within a predefined period (repetition which is typical to encryption); etc.

The near real-time module 1040 repeatedly analyzes I/O Sequences (separately for each running process) the audit log 1042 to determine whether anomalies within the process exist. Upon completing each repetition, analyzer 1044 issues a risk score & context indicating the probability that the I/O sequence related to a process (within the log) is ransomware. It should be noted that the context and content analyzer evaluate the variety of audit log parameters and issues a global risk score & context at its output.

A variety of these parameters may validly possess a wide range of legal values in most contexts, but only when combining them with the context of other parameters, the output risk score & context may hint to ransomware.

For example, an entropy check may be useless when testing a binary file (like *.exe). However, if the test shows a significant change to entropy in a Plain Text file and in the context of other audit-log parameter indications, the risk score & context may imply ransomware. The use of machine-learning model content and context analyzer 1044 is ideal in this environment of many parameters, significant variations of each parameter, and a huge number of possible combinations, as it enables the issuance of an accurate risk score & context.

For example, hereunder are more types of context and content anomalies that are characteristic of ransomware, as follows:
a. Sequence: The encryption by ransomware typically involves the performance of one or more well-defined sequences of I/O operations, for example: Read a file→Create a file with the same naming convention but different extension→Delete (or erase) the original file. A "sequence" is defined when these operations appear in this order within a short period. An alarm for a possible ransomware is issued once such a sequence is detected, which is generally irregular during normal operation of the monitored system 1000. Similar other sequences may also be included in a sequence check. Therefore, a sequence-type check involves a backward verification of previously performed operations. Other sequences that may also be monitored are: Intermittent encryption sequence, file header encryption pattern, volume of tempered\enumerated files of specific types during a short interval, the operation context—doing I/O operation sequence which can be legitimate with specific context like timeframe, process type, user account etc.
b. Enumeration: Typically, before performing the encryption of files by ransomware, the ransomware performs enumeration of files. This enumeration procedure typically selects the user's files subjected to later encryption. The enumeration process is also a well-defined sequence of operations that can be detected by analyzing the audit log.

The anomaly risk score & context is conveyed to rules 1050 (rule-based engine), which issues, based on the risk score & Context, a result R L containing (a) one or more actions to be taken (b) a decision to audit and monitor further—in case that the score & context does not show significant probability of ransomware.

The functionality 1200 of the VSS module 1010 is described in the block diagram of FIG. 2. In step 1012, an API call is received and hooked for further verification in step 1014. Hooking in itself is a technique known in the art. In step 1014, the API call is checked to determine whether the call relates to the VSS. In the case of "No", the procedure ignores the call, and a next API call can be issued. If, however, it is determined that the API call indeed relates to the VSS, the procedure continues to step 1016. Step 1016 verifies whether the call tries to delete the VSS (i.e., delete the VSS-type backup). Again, the procedure ignores the call-in case of "No", and a next API call can be issued. If, however, it is determined that the API call tries to delete the VSS, the procedure continues to step 1018. Step 1018 in FIG. 3 checks in step 1206 whether the user or the respective process appropriately performed the exclusion procedure 1106 before this API call.

The exclusion procedure 1106 is a unique predefined challenge of one or more steps that the process or user must appropriately perform before carrying out the respective monitored operation. This procedure, however, is typically known only to the valid administrator (or other authorized persons) of the system. If the exclusion procedure 1106 was indeed successfully performed before the issuance of the VSS deletion call, the call is authorized and performed in step 1214, and the next API call can be processed. Otherwise, if it is determined in step 1206 that the exclusion procedure 1106 has not been appropriately performed before the issuance of the API call, a "high fidelity alert" is issued in step 1208.

The "high fidelity alert" is a strong indication for ransomware. Following this alert, step 1210 (result $R_V$) immediately terminates the respective process and is continued by additional steps selected from (a) an alert to the administrator; (b) checking for possible damages that have already occurred; (c) recovery of damaged files utilizing the main backup (if still available), HL backup or the VSS; (d) investigation of the detected ransomware to improve the capabilities of the machine-learning near-real-time module 1040; etc., (additional steps a-d, hereinafter referred to as "additional steps or additional").

Figure 4:
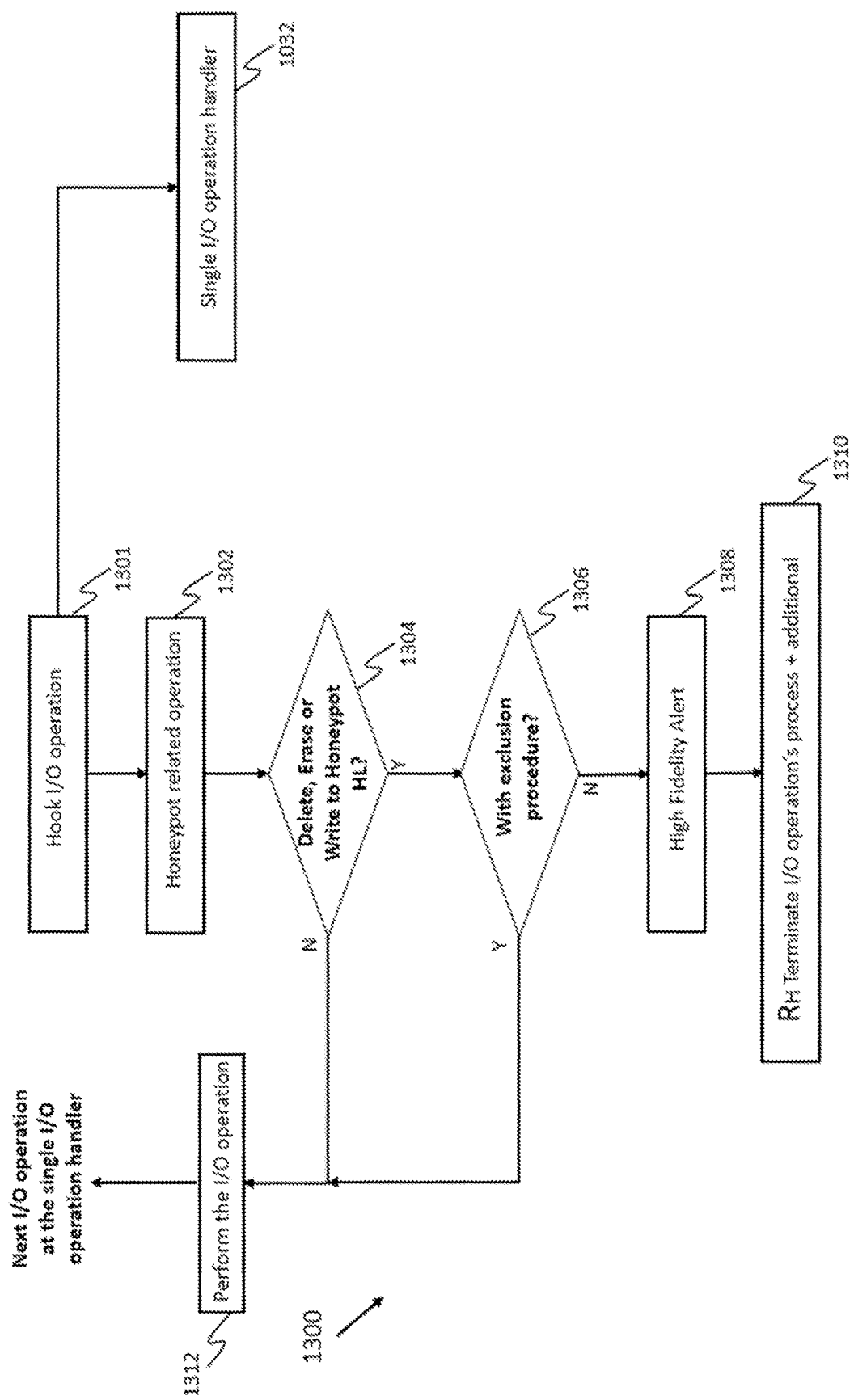
FIG. 4 is a block diagram of Honeypot Module procedure treating attempt to delete, erase or write to Honeypot Hardlink.

The functionality 1300 of the honeypot module 1020 is described in the block diagram of FIG. 4. As previously noted, honeypot HL are defined and spread within the system before the normal protection operation of system 1000.

In step 1301, the present I/O operation is hooked If the I/O operation relates to a honeypot HL (i.e., any operation that addresses the previously created honeypot HL), the procedure continues to step 1302. All other I/O operations are conveyed to the single I/O operation handler 1032 (described later in this description). In step 1304, the procedure checks whether the honeypot HL operation is one of Delete, Write of the HL. In the case of "N", step 1312 performs the operation, and the next I/O operation is processed. Otherwise, if step 1304 finds that the operation relates to deleting or writing, a honeypot H L, (operations that should generally and validly occur only in very rare cases and when occurred, it would raise high fidelity alert), the procedure continues to step 1306. Step 1306 checks whether the respective predefined exclusion procedure has been appropriately performed before issuing the delete or write honeypot HL operation. If it is determined in step 1306 that the exclusion procedure has been appropriately performed ("Y" in step 1306), step 1312 performs the operation, and the next I/O operation is processed. If, however, it is determined in step 1306 that the exclusion procedure has not been performed (or inappropriately performed—"N" in step 1306), a high-fidelity alert is issued in step 1308 indicating ransomware detection. Following the alert of step 1308, the procedure of step 1310 (result $R_H$) immediately terminates the respective I/O process and continues by the additional steps.

Figure 5:
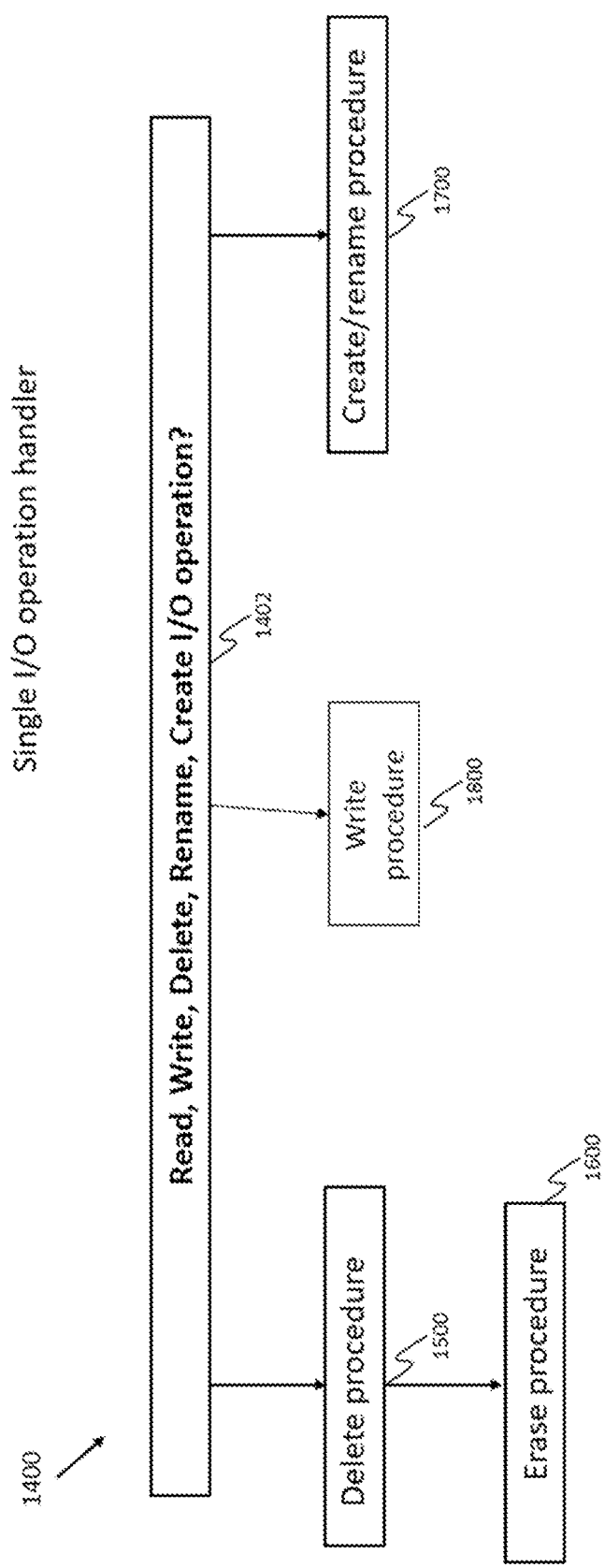
FIG. 5 is a block diagram of a Single I/O operation handler.

The general functionality 1400 of the single I/O operation handler 1032 (FIG. 2) is described in the block diagram of FIG. 5. Single I/O operation handler receives all the (already hooked) I/O operations that are not handled by the honeypot protection module 1020 (as shown in FIG. 4). Typically, the single I/O operation handler 1032 receives the following I/O operations: Read, Write, Delete, Rename, and Create. each Delete operation is handled by the delete procedure 1500. Each Erase operation (actually a Write operation that immediately appears after a Delete operation to the same file data offset address) is handled by the Erase procedure 1600, and each Create or Rename operation is handled by the Create/Rename procedure 1700. The Read operations, when they appear, are ignored, namely, they are considered valid. The Read operations are permitted but documented in the audit log.

Figure 6:
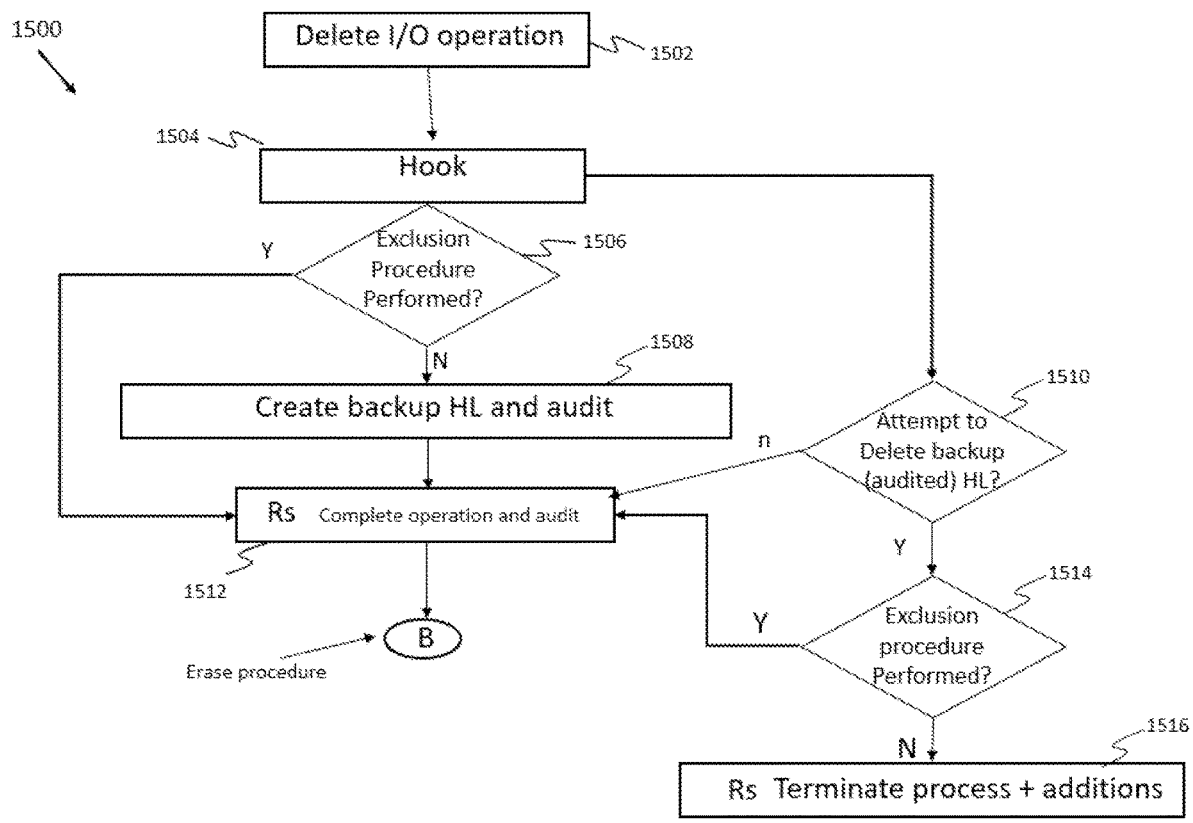
FIG. 6 is a block diagram of a Delete procedure treating attempt to delete I/O operation.

The functionality 1500 of the delete I/O operation is described in the block diagram of FIG. 6. In step 1502 a delete operation is received. In step 1504, the delete operation is hooked for further inspection. Step 1506 checks whether an exclusion procedure was performed immediately before the issuance of the delete operation. In the positive ("Y") case, the procedure continues to step 1512 where the delete operation is performed. If, however, the exclusion procedure has not been appropriately performed immediately before the delete operation ("N" in step 1506), a backup hard link is created in step 1508, an indication is issued to the near real-time module 1040 to audit the operation, and the operation completes successfully. The audit to the audit log 1042 is performed in Realtime.

Like in the case of the honeypot procedure 1104, the hard link created in step 1508 is a pointer to the same file data offset location indicated by the delete operation (without duplicating the data).

This hard link serves as a backup to the file designated for deletion. A deletion operation deletes a pointer to the targeted file, but the data itself remains intact as long as new data is not written to the same disk location. Therefore, the created backup hard link (namely, a pointer to the targeted location) serves as a backup for a possible case that it is eventually determined that the source of this delete operation is ransomware. Given the backup hard link, the procedure continues to step 1512, where the delete operation is again performed and audited in Realtime by the near Real-time module 1040 (result $R_s$).

The procedure also possibly continues ("B" in the scheme) to the Erase procedure, (described later in the description), when a write attempt to the same disk location arrives immediately after the already performed Delete operation.

Once a backup hard link is created (without duplication of the data), the permission to delete a backup hard link is given only to a user or process that passed the requirements of an exclusion procedure 1106. Therefore, the branch of steps 1510, 1514, and 1516 is dedicated only to cases of a Delete operation, targeting a backup hard link.

Step 1510 checks whether the Delete operation attempt targets a backup hard link. In the negative case, nothing happens. However, in the "Y" case, the procedure continues to step 1514, verifying whether the exclusion procedure 1106 was performed immediately before the Delete operation targeting the backup hard link. If "Y", the procedure again goes to step 1512. If, however, step 1514 finds that the exclusion procedure 1106 was not performed immediately before the Delete operation ("N" in step 1514), it is concluded that the operation originated from ransomware, and in step 1516 the originating process is terminated, and additions steps are taken.

Figure 7:
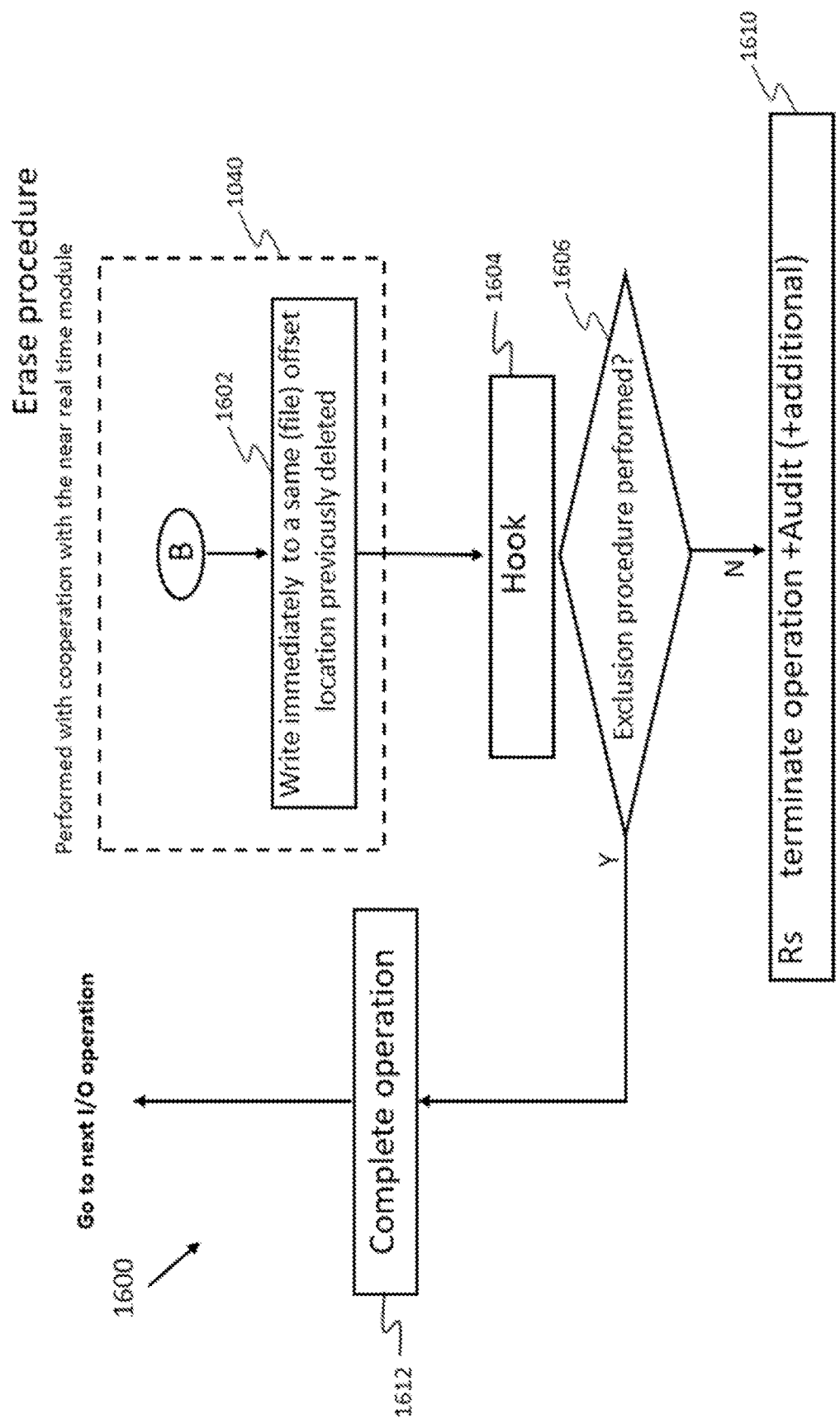
FIG. 7 is a block diagram of an Erase procedure treating attempt to write immediately to a same (file) offset location previously deleted.

The functionality 1600 of the Erase I/O operation is described in the block diagram of FIG. 7. As previously noted, an Erase operation is defined as a Write operation to the same storage location that was just previously deleted by the same process and security context. The observation that a Write operation is, in fact, an Erase operation is made by the near real-time module 1040 (possibly by an analyzing unit positioned there).

In step 1604, the current Write operation is hooked for verification. In step 1606, the procedure verifies whether the respective user or process have appropriately performed the predefined exclusion procedure. If "Y", the write operation is allowed, and the operation is performed in step 1612. Otherwise, if the observation of step 1606 is "N", the procedure continues to step 1610, concluding that ransomware has been detected. The originating process of the operation is terminated, and additional steps may be taken.

Figure 8:
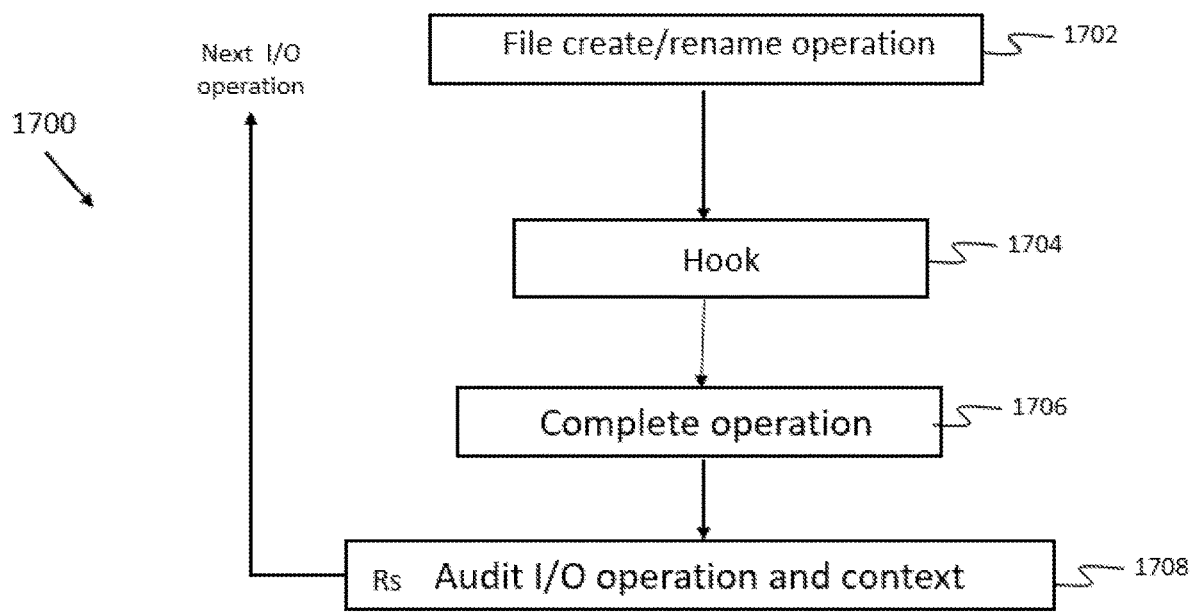
FIG. 8 is a block diagram of File creation or rename.

The functionality 1700 of the file Creation and Rename I/O operations is described in the block diagram of FIG. 8. Operations of Reading, Creating and Renaming Files are generally legal operations; however, they should be audited, in order to allow the ML analytic model, use this data in I/O operation sequence identification.

In step 1702 a file-Create or a file-Rename operation is received. The operation is hooked in step 1704 for further verification. In step 1706, the operation is completed, and in step 1708 the operation (and its context, similar to other procedures in all other operations) is conveyed for further audit by the near real-time module 1040.

Figure 9:
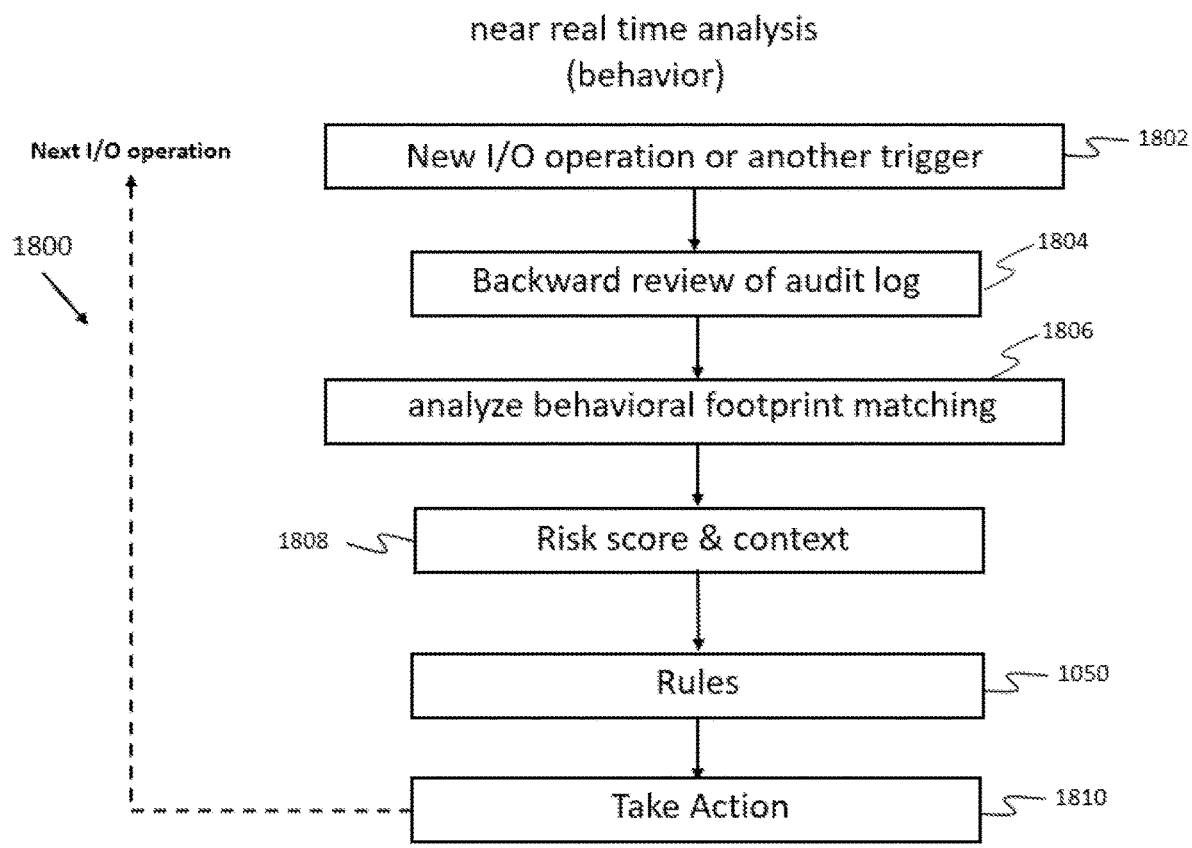
FIG. 9 is a block diagram of the procedure of near Realtime analysis of ransomware behaviour fingerprint matching.

FIG. 9 illustrates a procedure 1800 for detecting ransomware behavioral fingerprint according to an embodiment of the disclosure. The procedure 1800 is performed by the near real-time module 1040.

The detection of ransomware behavioral fingerprint requires detecting and analyzing sequences of I/O operations characteristic of ransomware. In step 1802 each new I/O operation (or another trigger) initiates the procedure. In step 1804, a backward (in time) review of the audit log 1042 is performed (separately for each relevant process), and in step 1806 the context and content analyzer 1044 analyzes the log for possible existence of anomalies, such as predefined malicious operation sequences, entropy or fuzzy hash above a predefined level, etc.

The analysis of step 1806 issues a risk score & context 1808, indicating the probability that ransomware has been detected within the audit log 1042. In step 1812, the risk score & context of step 1808 is submitted to rules unit 1050, that is based on the severity of this risk score & context (and possibly on additional previous observations) determines which action (or combination of actions) to take.

If risk score & context 1808 indicates high probability of ransomware, the action of step 1810 may include, among other actions, termination of the respective process, notification to an administrator, etc. If, however, risk score & context 1808 does not clearly indicate ransomware (i.e., a risk score & context below some threshold), the action of step 1810 may proceed to the next I/O operation without taking any action.

Example 1—Content Verification

The system of the disclosure may monitor file content modifications for each specific Write operation, and later on in a more global manner with respect to entire modified file. Verification mechanisms may be used, such as:
(a) Fuzzy hash—compression function for calculating the similarity between digital files. The fuzzy hash function holds a certain tolerance for changes and can tell how different two files are by comparing the similarity of their outputs. This basically compares all changes made in a file compared to the original file or the latest available VSS backup using Fuzzy-Hash. Encrypted content differs dramatically from the original content, so this technique can identify advanced encryption methods such as Intermittent encryption or partial encryption with much better accuracy than comparing the entire changed file with original file changes made to the entire file.
(b) Entropy—a level of disorder in a file (or a section thereof) after the requested change by the postponed I/O command, compared to the level of entropy of the same file before this change. It should be noted that most recent ransomware avoid detection by encrypting only a portion of the file, thereby avoiding failure in an entropy test applied by some prior art protection programs. The system of the disclosure overcomes this limitation by isolating only those amended sections of the file and comparing them with only respective sections of the file before the amendment (while ignoring non-amended sections). More specifically, encrypted content has a high level of disorder (Entropy), creating anomaly in text-based encrypted files. Since only the changed parts are checked and compared with the original file or the latest VSS backup, this technique can identify ransomware applying advanced encryption such as Intermittent encryption or partial encryption with much better accuracy compared to traditional malware detection systems that apply entropy check on the entire file (before or after the encryption, respectively).

Example 2—General Verifications

The system may also monitor one or more of the following issues (unless otherwise indicated, the monitoring of the following issues is performed by near real-time module 1040):
(a) An attempt to systematically erase data (particularly for known ransomware targeted file-types). The erase of a file (namely, delete and immediately change the data in the same disk location, namely same file's address) without using the predefined exclusion procedure is a clear indication for malicious activity. Sometimes there is a necessity to perform a legitimate erase, for example in the case of wiping sensitive information from deprecated physical devices. Those legitimate procedures can be identified by the system of the disclosure ahead of time and excluded. The exclusion procedure may use, for example, a specific process name, timeframe for the execution, security context etc.;

(b) File Created\Renamed with custom extension\unmatched file signature (Or ransomware known extension). Most known ransomware use custom file extensions different from the original file's extension. Following the encryption of a file, the ransomware either rename the encrypted file, or create a new file with a different extension after erasing the original file. Some of the ransomware uses known extensions associated with ransomware and some are custom extensions. Known file types are typically targeted (namely, office docs, PDF, images etc.) have a signature property embedded in the file's header which suggests the file type regardless of the file extension, as well as other indicators such as file metadata. With the file being encrypted and the extension changed—the signature and the extension do not match the original:

(c) An attempt to delete VSS backups (without successfully performing the exclusion procedure—the monitoring is performed by the VSS protection module 1010). Any attempt to delete VSS backup without successfully performing the exclusion procedure is considered malicious;

(d) Enumeration of ransomware-oriented file types on the entire disk or volume. Ransomware usually enumerates important files containing data or that are vital for the operating system to operate, in order to finish the encryption process as fast as possible and to avoid time waste on less important files. The detection of enumeration of such files or part of them is an alert for ransomware:

(e) An attempt to delete or change a file honeypot (the monitoring of these events is performed by the honeypot protection module 1020). As described—there is no legitimate reason for a file honeypot to be tampered by any legitimate process.

(f) An attempt to transfer and\or delete the decryption keys

Figure 10:
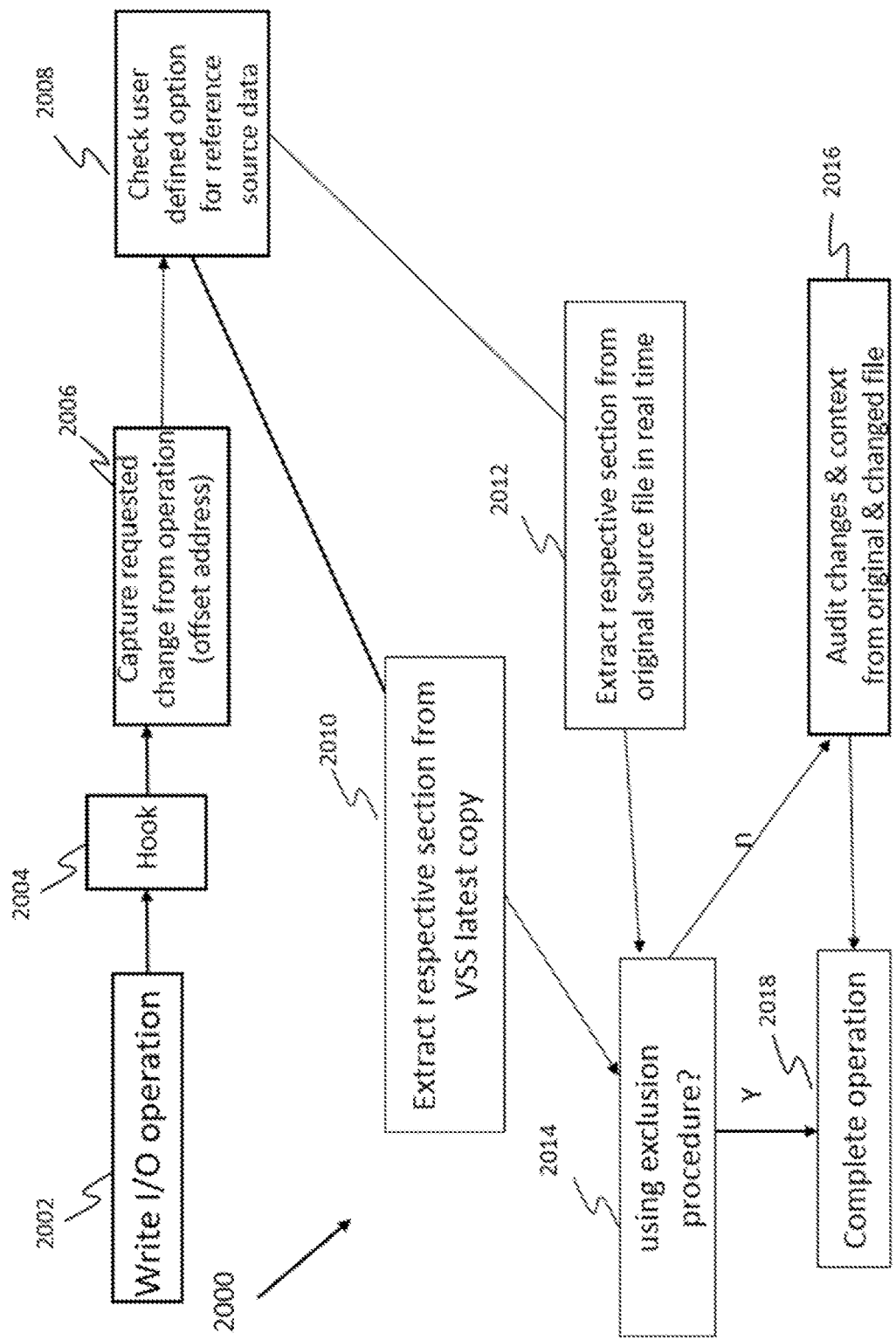
FIG. 10 is a block diagram of write single I/O operation module, showing the procedure of checking user defined option for reference source data either from VSS or from original source file in Realtime.

FIG. 10 illustrates a procedure 2000 for detecting entropy or fuzzy hash irregularities according to an embodiment of the disclosure. Procedure 2000 utilizes either the VSS or the target file for this purpose. In step 2002 a write operation is received and is hooked in step 2004. The write operation indicates a change to a file. In step 2006, the requested change is captured from the operation (offset address). In step 2008 the address of the target file and section within the file for which the change is requested is determined from the write operation. According to one technic, in step 2010, the corresponding file within the VSS backup is determined and the corresponding section (corresponding to the change requested within the write operation) is extracted from the corresponding VSS file. If the reply to the next step, using exclusion procedure 2014 is "Y", the operation is completed in step 2018. If the reply to the next step 2014, is "N", the Write I/O operation is directed to Audit changes & context from original & changed file 2016 and only then, the operation is completed 2018.

In another technic, the capture requested change from operation (offset address) 2006 directs the Write I/O operation 2002 to step 2008, to check user defined option for reference source data and the step 2012, to extract respective section from original source file in Realtime, (instead of to VSS 2010). The next steps taken are the same as above.

The changes from the VSS are provided to a content (entropy or fuzzy hash) unit 2010 and the changes from the original source file are provided to a content (entropy or fuzzy hash) unit 2012. Units 2010 & 2012 perform the comparison accordingly. The entropy and/or fuzzy hash are evaluated by units 2010 & 2012 relative to the current change, respectively, or to the entire file. The respective result of the entropy or fuzzy hash check is compared to a threshold internally implicit within the machine learning analyzer 1044. The evaluation preferably also considers prior amendments made to the same file by the same operation issuing process (to account for a case where the changes were gradually made by several write operations). The evaluation result is conveyed to unit 2014, and the further actions depend upon the answer to unit 2014, as described above.

There is a tradeoff between the techniques of FIG. 10 utilizing the VSS for the comparison 2010 and the technique utilizing the original file 2008 (before execution of the requested change).

While the Realtime technique 2008 is more accurate, as it compares the requested (write) amendment with the file in its most recent version (i.e., the file just before the execution of the write operation), it requires more computational resources compared to the technique of VSS 2010 that compares the requested (write) change with the file as saved at the VSS. The respective file at the VSS may reflect the file version as saved several hours before (depending on the VSS definitions). Therefore, the technique of 2010 is less accurate but requires fewer computations and is faster than the technique 2008.

While some embodiments of the disclosure have been described by way of illustration, it will be apparent that the disclosure can be carried into practice with many modifications, variations, and adaptations, and with the use of numerous equivalent or alternative solutions that are within the scope of persons skilled in the art, without departing from the spirit of the disclosure or exceeding the scope of the claims.

What is claimed:

1. A computer-implemented method for detecting and terminating a ransomware attack, the method comprising:
    protecting, by a Volume Shadow Copy Service (VSS) protection module, against deletion and handling application programming interface (API) calls;
    handling input output (I/O) operations, by a Honeypot protection module, so that honeypot hard links (HL) are utilized as a second pointer that a same valid file data is pointed to without consuming extra disk space, the I/O operations being different from the API calls;
    considering as invalid any I/O operations of Delete or Write to the honeypot HL and creating the honeypot HL for every file of any I/O operations of Delete without performing an exclusion procedure;
    conveying the I/O operations considered invalid as High-Fidelity Alert operations that should be terminated;
    handling, by a single I/O operation module, Read, Write, Delete, Rename and Create I/O operations;
    handling the I/O operations, by a Realtime module and a near Realtime module, at least some of the I/O operations comprising an Audit log and Context & Content Analyzer configured to convey to a rules based engine;
    using characteristic parameters of one or more known classified ransomware during a training phase to create a machine-learning-based model configured to analyze data in the audit log issuing a risk score and context reflecting a probability that an audit log timeline per process at its input reflects ransomware;

serving, by the audit log, the Realtime module and the near Realtime module as a data source for a machine learning (ML) analytic module of a ransomware behavioral fingerprint;

marking for further inspection, during normal system operation, content of the audit log that contains operations, properties and context;

analyzing for possible anomalies, by the audit log, the content marked for further inspection to indicate one or more behavioral parameters of a running process;

defining, by the rules based engine, a conclusion and actions based on a risk score and context received from the Realtime module and the near Realtime module, the conclusion and the actions comprising one or more actions to be taken, a decision to audit and monitor further in case that the risk score and context does not show significant probability of ransomware;

upon operation of the High Fidelity Alert operations, terminating a respective process and performing at least one of (a) an alert to an administrator; (b) checking for possible damages; (c) recovery of damaged files utilizing a main backup if still available, HL backup or the VSS; (d) investigation of the detected ransomware to further train a machine-learning near-Realtime module;

performing one or more exclusion procedures on API calls and the I/O operations configured to determine whether a related operation is performed by an authorized human being and/or an authorized non interactive process, the one or more exclusion procedures comprising one or more manipulations of interactive operation, process name, process type, timeframe, geo-location, source-target IP-server of an operation user identity, user roles, target file properties, operating system (OS) type and state, using MFA (multi-factor authentication), signed operation and one or more user defined measurable property for limiting or prohibiting the performance of actions; and composing, by a honeypot HL file naming convention, of a fixed length unique hash of a file full path and a timestamp.

2. The method of claim 1, wherein an alert from the High Fidelity Alert operations is an indication for ransomware.

3. The method of claim 1, further comprising: hooking and verifying, by at least part of a hook process, any Delete API call relating to VSS by a verification entity, the hook process being configured to monitor and detect an attempt to delete the VSS.

4. The method of claim 1, wherein the audit log is associated with a respective context, and wherein records within the audit log comprise one or more of context parameters comprising Process Image, Process Name, Process ID, Parent Process ID, Timestamp, Source File Path, Target File path only for Delete I/O operations, Target File name, the respective operation, UHash, FHash, Entropy, User (security context), File signature, Domain, logon type (interactive\non-interactive).

5. The method of claim 1, wherein the audit log is associated with a respective context for the Rename I/O operations, wherein records within the audit log include one or more of context parameters comprising a timestamp, an old file name, a new file name, an auditing and a change of extension only.

6. A computer-implemented method for detecting and terminating a ransomware attack, the method comprising:

protecting, by a Volume Shadow Copy Service (VSS) protection module, against deletion and handling application programming interface (API) calls;

handling input output (I/O) operations, by a Honeypot protection module, so that honeypot hard links (HL) are utilized as a second pointer that a same valid file data is pointed to without consuming extra disk space, the I/O operations comprising the API calls;

considering as invalid any I/O operations of Delete or Write to the honeypot HL without performing an exclusion procedure;

conveying the I/O operations considered invalid as High-Fidelity Alert operations that should be terminated;

handling, by a single I/O operation module, Read, Write, Delete, Rename and Create I/O operations;

handling the I/O operations, by a Realtime module and a near Realtime module, at least some of the I/O operations comprising an Audit log and Context & Content Analyzer configured to convey to a rules based engine;

using characteristic parameters of one or more known classified ransomware during a training phase to create a machine-learning-based model configured to analyze data in the audit log issuing a risk score and context reflecting a probability that an audit log timeline per process at its input reflects ransomware;

serving, by the audit log, the Realtime module and the near Realtime module as a data source for a machine learning (ML) analytic module of a ransomware behavioral fingerprint;

marking for further inspection, during normal system operation, content of the audit log that contains operations, properties and context;

analyzing for possible anomalies, by the audit log, the content marked for further inspection to indicate one or more behavioral parameters of a running process;

defining, by the rules based engine, a conclusion and actions based on a risk score and context received from the Realtime module and the near Realtime module, the conclusion and the actions comprising one or more actions to be taken, a decision to audit and monitor further in case that the risk score and context does not show significant probability of ransomware;

upon operation of the High Fidelity Alert operations, terminating a respective process and performing at least one of (a) an alert to an administrator; (b) checking for possible damages; (c) recovery of damaged files utilizing a main backup if still available, HL backup or the VSS; (d) investigation of the detected ransomware to further train a machine-learning near-Realtime module;

performing one or more exclusion procedures on API calls and the I/O operations configured to determine whether a related operation is performed by an authorized human being and/or an authorized non interactive process, the one or more exclusion procedures comprising one or more manipulations of interactive operation, process name, process type, timeframe, geo-location, source-target IP-server of an operation user identity, user roles, target file properties, operating system (OS) type and state, using MFA (multi-factor authentication), signed operation and one or more user defined measurable property for limiting or prohibiting the performance of actions;

upon receiving a Delete API call relating to VSS, conveying the Delete API call to a VSS handler to verify performing of the exclusion procedure; and upon performing the exclusion procedure, approving and performing the Delete API call and performed; or in response to the exclusion procedure not being performed, proceeding to High Fidelity Alert operations that are terminated.

7. The method of claim 1, further comprising:
upon receiving, hooking and verifying an I/O operation, whether the I/O operation tries to delete or write to a honeypot HL, if verified as an attempt to delete or write to a honeypot HL, transferring the I/O operation to verify if the exclusion procedure was performed; and
upon performing the exclusion procedure, continuing performance of the I/O operation; or
in response to the exclusion procedure not being performed, terminating the I/O operation.

8. The method of claim 1, further comprising: applying, by the exclusion procedure, one or more additional limitations using a user's ID, one or more predetermined hours during a day, a source workstation from which an operation request was initiated, and a location of a requesting workstation.

9. The method of claim 1, further comprising:
receiving the Delete I/O operation;
hooking and verifying the Delete I/O operation of the exclusion procedure; and
upon performing the exclusion procedure, approving, completing and auditing the Delete I/O operation.

10. The method of claim 1, further comprising:
upon receiving the Delete I/O operation, hooking and verifying if the Delete I/O operation attempts to delete a backup HL; and
upon receiving a response that is no to deleting the backup HL, approving, completing, and auditing the Delete I/O operation;
upon receiving the response that is yes to deleting the backup HL, transferring the Delete I/O operation in order to verify if the exclusion procedure was performed;
upon performing the exclusion procedure, continuing the I/O operation to be completed and audited; or
in response to exclusion procedure not being performed, terminating the I/O operation.

11. The method of claim 1, further comprising:
upon receiving the Delete I/O operation, performing with a cooperation of the near Realtime module, the cooperation comprising a Write operation to write to a file offset location,
hooking the Write I/O operation and verify performing of the exclusion procedure; and
upon performing the exclusion procedure, approving and completing the I/O operation comprising write/delete operations; or
in response to exclusion procedure not being performed, terminating and auditing the I/O operation.

12. The method of claim 1, further comprising:
receiving and hooking a Create/Rename File I/O operation, unless any other specific indication of ransomware appear, and the operation is audited and allowed to complete.

13. The method of claim 1, further comprising:
upon receiving and hooking the Write I/O operation, capturing a requested change from operation file offset address;
conveying the operation to check a user defined option for reference source data either to extract a respective section from a VSS latest copy or extract a respective section from original source file in Realtime;
checking a completion of performing the exclusion procedure; and
upon performing the exclusion procedure, completing the operation; or in response to the exclusion procedure not being performed, completing the operation is allowed only after one or more changes in the audit log, the one or more changes comprising changes in one or more context parameters and a change in file data.

14. The method of claim 1, wherein for every Write I/O operation, one or more records within the audit log comprise one or more of context parameters comprising Changed Offset address(es), File signature, Process Image, Process Name, Process ID, Parent Process ID, Timestamp, File Path, UHash, FHash, Logon type, Entropy, User, Domain.

15. The method of claim 1, further comprising: receiving, by the rules based engine, incidents with an assigned risk score from the ML analytic module and comparing it to a user predefined threshold; and
performing one or more of the following actions:
preventing process access to files (using a hook technic);
killing a process thread;
notifying a moderator by Email\SMS;
applying Hardening policy based on compliance baseline;
restoring a file from HL;
presenting interactive interface for file restoration for end-user;
dumping an entire memory or specific process to disk;
initiating forensic procedure, including full artifacts collections;
adding found IOC's to endpoint detection and response (EDR);
applying advanced auditing on files, folders and file shares;
blocking\monitoring network protocols that can be used for C2\Lateral movement\Data exfiltration;
sending collected data to a syslog\siem;
forcing MFA for authentication;
initiating proactive threat hunting process;
restoring file\folder from VSS backup; or
checking a process image with 3rd party malware analysis service API.

16. The method of claim 1, wherein the ransomware behavioral fingerprint comprises (a) suspected I/O sequences indicative of ransomware; (b) suspected content modifications to one or more files causing some specific file types to exceed normative threshold for fuzzy, hash or entropy tests; (c) an operation configured to delete Decryption keys; and (d) a repetitive execution of encryption related I/O operations within a predefined period.

17. A non-transitory computer-readable medium storing instructions that, when executed by a processor, cause the processor to perform a method for detecting and terminating a ransomware attack, the method comprising:
protecting, by a Volume Shadow Copy Service (VSS) protection module, against deletion and handling application programming interface (API) calls;
handling input output (I/O) operations, by a Honeypot protection module, so that honeypot hard links (HL) are utilized as a second pointer that a same valid file data is pointed to without consuming extra disk space;
considering as invalid any I/O operations of Delete or Write to the honeypot HL without performing an exclusion procedure;
conveying the I/O operations considered invalid as High-Fidelity Alert operations that should be terminated;
handling, by a single I/O operation module, Read, Write, Delete, Rename and Create I/O operations;
handling the I/O operations, by a Realtime module and a near Realtime module, at least some of the I/O operations comprising an Audit log and Context & Content Analyzer configured to convey to a rules based engine;

using characteristic parameters of one or more known classified ransomware during a training phase to create a machine-learning-based model configured to analyze data in the audit log issuing a risk score and context reflecting a probability that an audit log timeline per process at its input reflects ransomware;

serving, by the audit log, the Realtime module and the near Realtime module as a data source for a machine learning (ML) analytic module of a ransomware behavioral fingerprint;

marking for further inspection, during normal system operation, content of the audit log that contains operations, properties and context;

analyzing for possible anomalies, by the audit log, the content marked for further inspection to indicate one or more behavioral parameters of a running process;

defining, by the rules based engine, a conclusion and actions based on a risk score and context received from the Realtime module and the near Realtime module, the conclusion and the actions comprising one or more actions to be taken, a decision to audit and monitor further in case that the risk score and context does not show significant probability of ransomware;

upon operation of the High Fidelity Alert operations, terminating a respective process and performing at least one of (a) an alert to an administrator; (b) checking for possible damages; (c) recovery of damaged files utilizing a main backup if still available, HL backup or the VSS; (d) investigation of the detected ransomware to further train a machine-learning near-Realtime module; and performing one or more exclusion procedures on API calls and the I/O operations configured to determine whether a related operation is performed by an authorized human being and/or an authorized non interactive process, the one or more exclusion procedures comprising one or more manipulations of interactive operation, process name, process type, timeframe, geo-location, source-target IP-server of an operation user identity, user roles, target file properties, operating system (OS) type and state, using MFA (multi-factor authentication), signed operation and one or more user defined measurable property for limiting or prohibiting the performance of actions;

upon receiving, hooking and verifying an I/O operation, whether the I/O operation tries to delete or write to a honeypot HL, if verified as an attempt to delete or write to a honeypot HL, transferring the I/O operation to verify if the exclusion procedure was performed; and upon performing the exclusion procedure, continuing performance of the I/O operation; or in response to the exclusion procedure not being performed, terminating the I/O operation.

18. The non-transitory computer-readable medium of claim 17, wherein the ransomware behavioral fingerprint comprises (a) suspected I/O sequences indicative of ransomware; (b) suspected content modifications to one or more files causing some specific file types to exceed normative threshold for fuzzy, hash or entropy tests; (c) an operation configured to delete Decryption keys; and (d) a repetitive execution of encryption related I/O operations within a predefined period.

* * * * *